US000001456H

United States Statutory Invention Registration [19]

[11] Reg. Number: H1456

Jero

[43] Published: Jul. 4, 1995

[54] FLAT END DIAMOND LOADING PROBE FOR FIBER PUSH-OUT APPARATUS

[75] Inventor: Paul D. Jero, Yellow Springs, Ohio

[73] Assignee: The United States of America as represented by the Secretary of the Air Force, Washington, D.C.

[21] Appl. No.: 85,892

[22] Filed: Jul. 6, 1993

[51] Int. Cl.[6] ..... G01N 3/24

[52] U.S. Cl. ..... 73/842; 73/85; 73/661; 73/841; 73/844; 73/845

[58] Field of Search ..... 73/85, 841, 842, 844, 73/845, 661

[56] References Cited

U.S. PATENT DOCUMENTS

| | | | |
|---|---|---|---|
| 4,747,310 | 8/1988 | Collins et al. | 73/661 |
| 4,844,781 | 7/1989 | Sanchez et al. | 204/132 |
| 4,948,758 | 8/1990 | Beall et al. | 501/3 |
| 5,106,680 | 4/1992 | King et al. | 428/288 |

FOREIGN PATENT DOCUMENTS

| | | | |
|---|---|---|---|
| 610890 | 10/1948 | United Kingdom | 73/85 |

OTHER PUBLICATIONS

R. J. Kerans et al, "Theoretical Analysis of the Fiber Pullout and Pushout Tests", J. Am. Ceram. Soc. vol. 74, No. 7, pp. 1585–1596 (1991).

*Primary Examiner*—Bernarr E. Gregory
*Attorney, Agent, or Firm*—Fredric L. Sinder; Bobby D. Scearce; Thomas L. Kundert

[57] ABSTRACT

A novel loading probe for fiber-matrix testing machines is made of diamond and has a truncated cone end for push-in and push-out tests of fibers in a fiber-matrix composite. The diameter of the probe body or shaft is greater than the diameter of the fiber to be pushed and the flat surface where the cone is truncated is at least one-half the diameter of the fiber. The included angle of the truncated cone is in the range of 55° to 90°. A useful compromise included angle is 70°.

2 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FLAT END DIAMOND LOADING PROBE FOR FIBER PUSH-OUT APPARATUS

RIGHTS OF THE GOVERNMENT

The invention described herein may be manufactured and used by or for the Government of the United States for all governmental purposes without the payment of any royalty.

BACKGROUND OF THE INVENTION

The present invention relates generally to testing machines for fiber-matrix composite materials, and more particularly to loading probes for fiber-matrix testing machines.

Fiber push-in and push-out has been used to measure interface properties in ceramic and metal matrix composites since the early 1980's. Interface properties are important for a variety of reasons. For example, as part of means for preventing crack propagation, some sliding may deliberately be allowed to occur at the interface between the fibers and the matrix in ceramic and metal matrix composites. Testing apparatus is required to measure the adhesion between the fibers and the matrix surrounding them to determine the effectiveness of various coatings and treatments for varying interface properties. Push-out type apparatus use a loading probe or probes to push on single or multiple fibers imbedded in a sectioned fiber-matrix composite. Variously placed sensors measure the displacements and forces on the probes and fiber-matrix test sample. A number of analytical approaches have been proposed in the past for analyzing the sensor data to derive interface properties, one of the most rigorous of which to date is the model of R. J. Kerans and T. A. Parthasarathy described in their paper, "Theoretical Analysis of the Fiber Pull-out and Push-out Tests," J. Am. Ceram. Soc., 74 [7], p 1585–1596 (1991), which is incorporated by reference.

Because there are no commercial push-out apparatus available, each unit is unique and customized for the particular type of composite being examined. Tested fibers run from relatively large monofilaments (>100 microns diameter) which are used in metal matrix and some ceramic matrix composites, to smaller textile (<25 microns) diameter fibers which are preferred for ceramic matrix composites. Textile fibers are fibers small and flexible enough to be woven into cloth. Large monofilaments are relatively stiff and generally cannot be woven.

The first probes used as push-out apparatus probes were standard diamond pyramid indenters, such as the well-known Vickers indenter commonly used in microhardness testers. They were used because they were available. The Vickers indenter is a four sided pyramid. Also occasionally used was the related Burkovick indenter which is a three sided pyramid. Unfortunately, because those indenters are sharply pointed, they plastically deform the ends of fibers. They also commonly crack and chip the pushed fiber. Further, the geometry of those indenters results in a substantial portion of the applied load acting perpendicular to the axis of the fiber. Finally, the shape of those indenters severely limited the maximum allowable fiber displacement that could be achieved. These problems made it virtually impossible to derive reliable quantitative information from a push-out test.

After four or five years, the limitations of the early indenters were realized and researchers began to look for alternatives. Eventually, flat-ended cylindrical tungsten carbide probes came into common use. These probes are a standard commercial item for other uses and are commonly available, including in the small sizes necessary to push textile diameter fibers. Unfortunately, cylindrical tungsten carbine probes are not very strong, particularly at the very small diameters needed to push textile fibers. Even at the larger sizes for monofilament fibers, cylindrical tungsten carbide probes are not strong enough to perform push-out tests at the high loads required to test some of the metal matrix composites. The loads required to push-out large monofilament fibers from a metal matrix are so high that prior art fiber-matrix testing machines have had to use very thin test sections to sufficiently reduce the loads so that the prior art probes would not break. With such thinly sectioned test samples, the results of those push-out tests are very unreliable.

It is seen, therefore, that there is a need for probes for fiber push-out testers that are sufficiently strong at small diameters to perform push-out tests for small diameter textile fibers and sufficiently strong at larger diameters to push-out large monofilament fibers from sectioned metal matrix composites sufficiently thick so that reliable test results can be obtained, all without damaging the fibers or otherwise introducing errors into the tests.

It is, therefore, a principal object of the present invention to provide a new and stronger probe for fiber push-out testers that is strong enough to perform reliable push-in and push-out tests not possible with prior art probes.

It is a feature of the present invention that it is simple and straightforward to use.

It is an advantage of the present invention that it produces more reliable test results by minimizing damage to the fibers being pushed.

These and other objects, features and advantages of the present invention will become apparent as the description of certain representative embodiments proceeds.

SUMMARY OF THE INVENTION

The present invention provides a diamond truncated conical loading probe for fiber push-in and push-out tests. The unique discovery of the present invention is that only a truncated conical diamond loading probe, having precise dimensions including a body diameter greater than the diameter of the fiber being tested, a diameter at the truncated pushing surface of at least one-half the fiber diameter and an included angle in the range of 55° to 90°, will be able to push fibers far enough to be useful and at the same time have sufficient strength to perform push-in and push-out tests on fiber-matrix composites for both small diameter textile fibers and larger diameter monofilament fibers in a metal matrix.

Accordingly, the present invention is directed to a loading probe for a fiber push-out apparatus, comprising a diamond probe body having an end in the shape of a truncated cone, wherein the diameter of the probe body is greater than the diameter of the fiber to be pushed, wherein the diameter of the flat surface where the cone is truncated is at least one-half the diameter of the fiber to be pushed, and wherein the included angle of the truncated cone is in the range of 55° to 90°.

The present invention is also directed to a method for performing a fiber push-out test on a fiber inside a fiber-matrix composite, comprising the steps of providing a diamond probe body having an end in the shape of a truncated cone, wherein the diameter of the probe body is greater than the diameter of the fiber, wherein the diameter of the flat surface where the cone is truncated is at least one-half the diameter of the fiber, and wherein the included angle of the truncated cone is in the range of 55° to 90°, and pushing the fiber with the flat surface where the cone is truncated.

DESCRIPTION OF THE DRAWINGS

The present invention will be more clearly understood from a reading of the following detailed description in conjunction with the accompanying drawings wherein.

DETAILED DESCRIPTION

Figure 1:
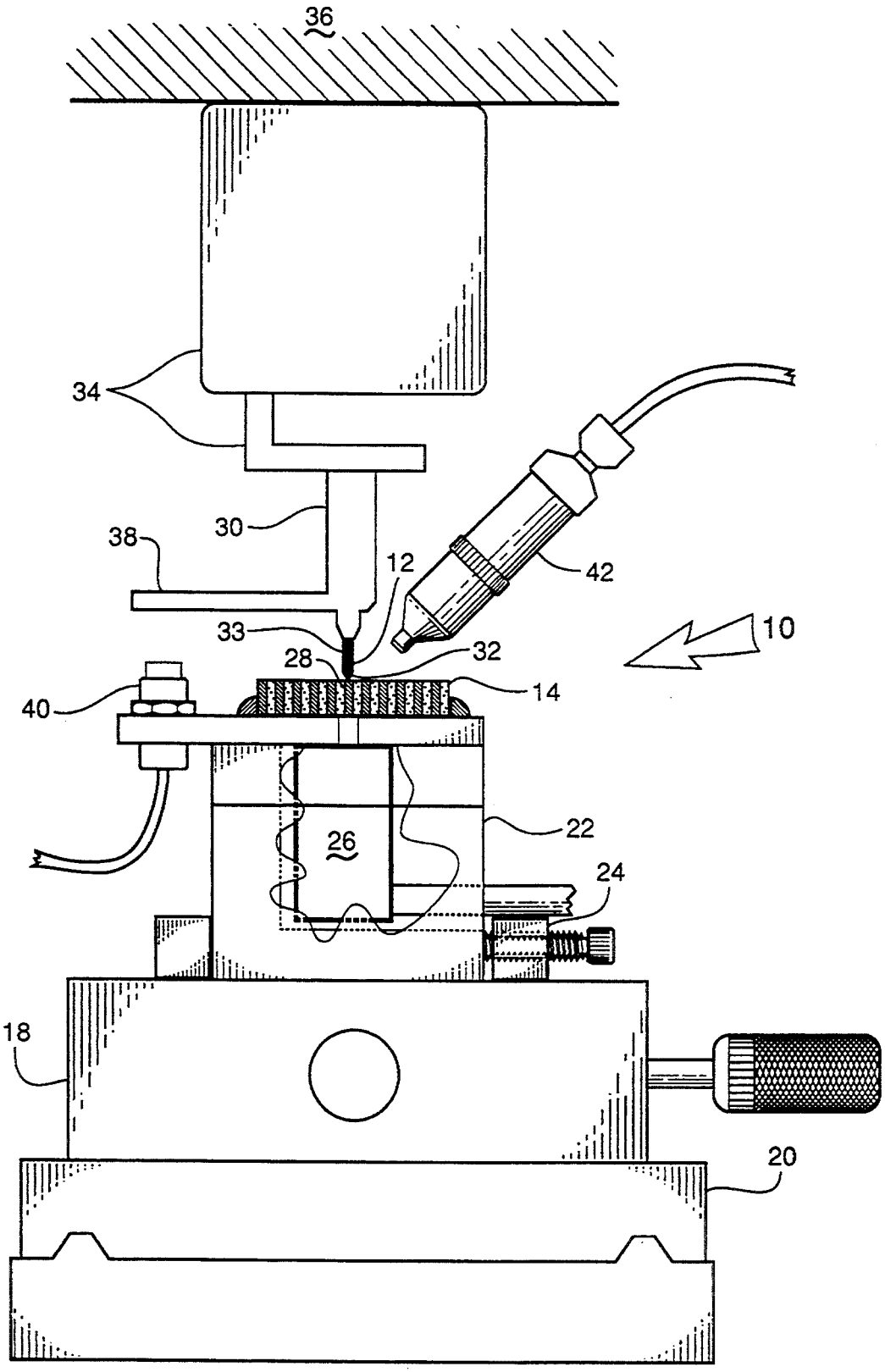
FIG. 1 is a front view of a typical push-out test apparatus showing the positioning of a loading probe according to the present invention and a sectioned fiber-matrix composite test sample.

Referring now to FIG. 1, there is shown a front view of a typical push-out test apparatus 10 showing the positioning of a loading probe 12 according to the present invention and a sectioned fiber-matrix composite test sample, or specimen, 14. Push-out test apparatus 10 is typically used for testing larger fibers.

Push-out test apparatus 10 rests on an X-Y stage 18 which in turn sits on top of a slider 20. Test specimen 14 is held in place on top of a holder 22 mounted to X-Y table 18 by a clamp 24. A transducer, or acoustic emission sensor, 26 is mounted inside holder 22 to measure the acoustic response of the sample. For example, a sharp acoustic-emission spike will generally occur at the moment of debonding of a fiber 28 from its surrounding matrix. Loading probe 12 comprises a small diamond piece 32 mounted onto a stainless steel rod 33. Loading probe 12 is mounted to a holder 30 which is in turn mounted to a load cell 34 for recording the forces placed on loading probe 12. Load cell 34 mounts on a crosshead 36. Holder 30 includes an extension 38, the displacement of which, and the corresponding displacement of loading probe 12, is measured by a capacitance extensometer 40. A video camera 42 records the progress of any tests.

Figure 2:
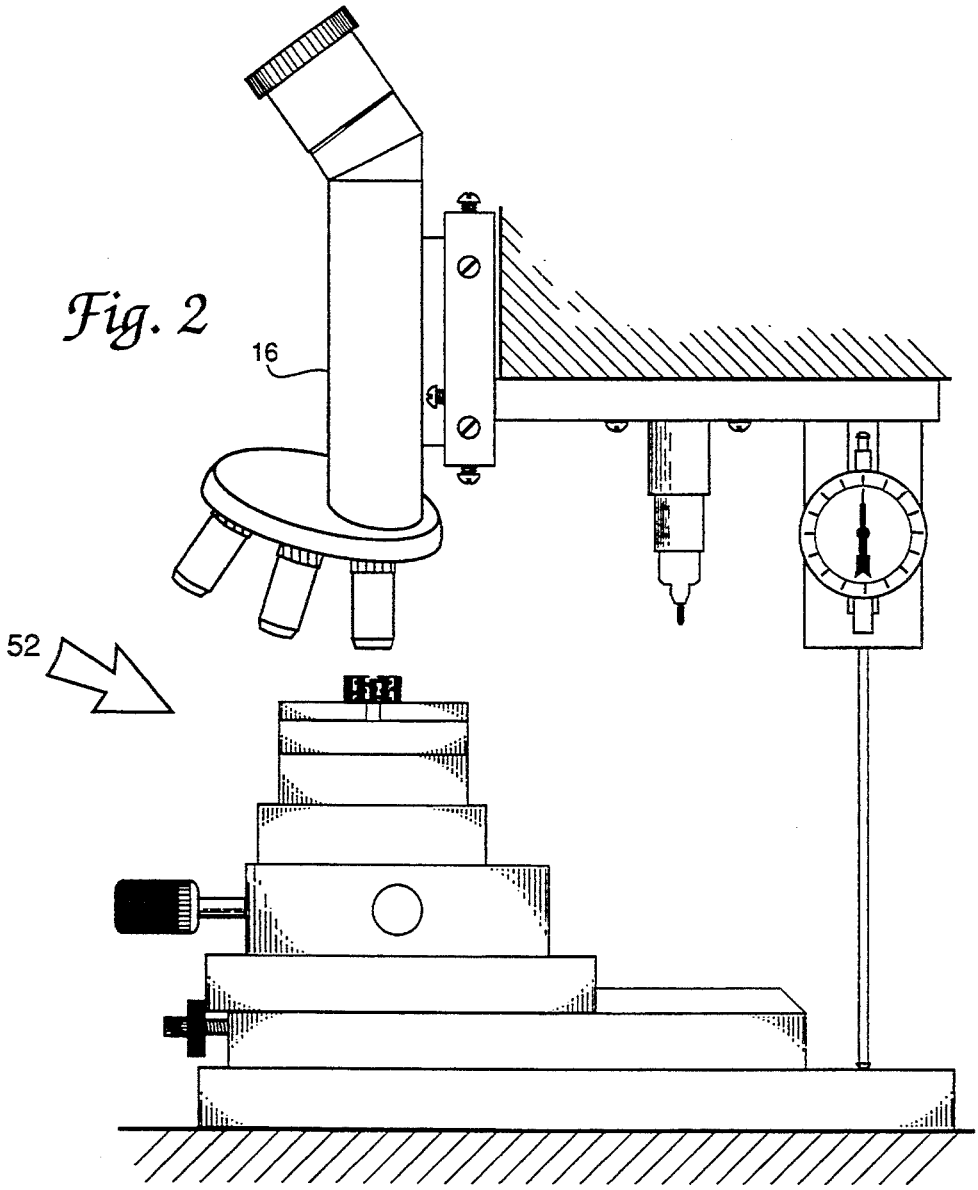
FIG. 2 is a side view of another push-out test apparatus.

FIG. 2 is a side view of another push-out test apparatus 52 showing a microscope 16 used for positioning fibers under the probe. Push-out test apparatus 52 is generally used for testing smaller fibers.

Figure 3:
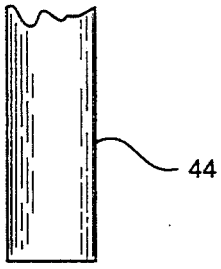
Fig. 3 Prior Art
FIG. 3 is a front view of a prior art tungsten carbide cylinder probe.

FIG. 3 is a front view of a prior art tungsten carbide cylindrical probe 44. As described in the Background of the Invention, cylindrical tungsten carbine probes are not very strong, particularly at the very small diameters needed to push textile fibers. And, as described, they are not strong enough to perform push-out tests at the high loads required to test some of the metal matrix composites.

Figure 4:
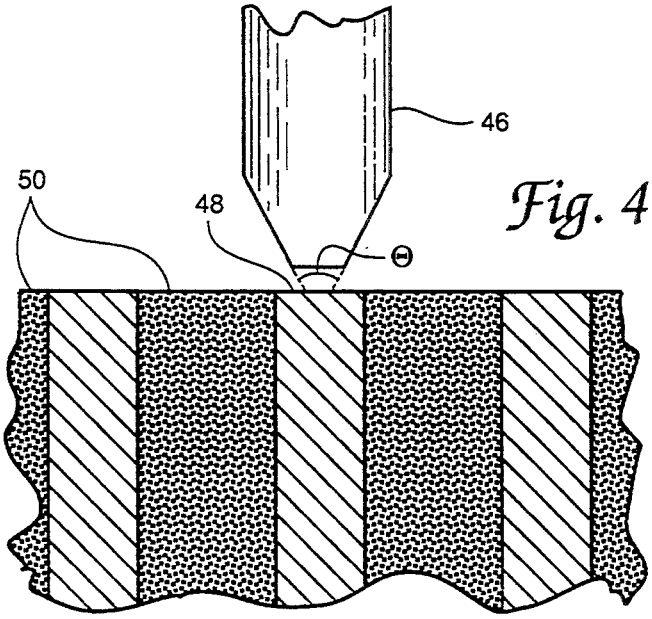
FIG. 4 is a front view of a truncated diamond cone probe according to the present invention.

FIG. 4 is a front view of a truncated diamond cone probe 46 according to the present invention along with a representative section of a fiber 48 inside a matrix 50. The included angle 8 of probe 46 is in a range of 55° to 90°. As shown in FIG. 4, the diameter of probe 46 is greater than that of the fiber 48 to be pushed, and the diameter of the flat surface where the cone is truncated and which contacts the end of fiber 48 is at least one-half the diameter of fiber 48. Making the diameter of the body of probe 46 greater than the diameter of the fiber to be pushed provides, along with the inherent strength of the diamond probe material, the necessary strength for pushing the fibers without the probe breaking. Making the diameter of the flat surface where the cone is truncated at least one-half the diameter of the fiber to be pushed is so that the probe does not damage the fiber and to preserve the validity of the test results.

It would seem, as has been shown by the most recent prior art tungsten carbide probes, that a cylinder just slightly thinner than the fiber to be pushed would be the preferred width and shape for a probe so that the probe can push a fiber a maximum distance through a fiber-matrix composite specimen. The problem is that, as previously described, such cylindrical probes are simply not strong enough. The diameter of the probe, even when made with material as strong as diamond, must still be greater than that of the fiber in order to have sufficient strength. As can be seen in FIG. 4, the included angle then becomes critical to how far the probe can push the fiber before contacting the surface of the matrix material. The included angle must first be less than 90° so that the probe can be inserted a sufficient distance to produce valid test results. The smaller the included angle, the desirably greater distance the fiber can be pushed. The limiting factor is that smaller included angles result in cone cross sections too small to have sufficient strength.

Through a series of tests, it has been discovered that the described range of dimensions for a diamond probe provide the only known range of dimensions that reliably work without breakage, without damaging the fiber and produce reliable valid test results. The test included a variety of diamond probes and probe dimensions, including a probe with a 70° included angle and a 10 micron flat pushing surface, the probe mounted to a 3 mm stainless steel rod 40 mm long, and a probe with a 55° included angle and a 95 micron flat pushing surface, the probe mounted to a 3 mm stainless steel rod 40 mm long. The first probe was used to push Nicalon TM fibers from BMAS glass-ceramic matrices using loads of up to about 250 grams. The second probe was used to push SCS-6 TM SiC fibers from a Ti-24Al-11Nb matrix using loads up to about 15 Kg. Included angles of about 70° have thus far worked well as a suitable compromise between strength and maximum fiber pushing distance. Below included angles of 55° , test probes generally broke. While further experiments with diamond probes more carefully selected for lack of imperfections and more carefully ground to included angles of less than 55° (the natural cleavage angle of a diamond probe is 120°), particularly for larger probes used for pushing larger fibers, may later be discovered to work, and thus allow greater push distances, it has thus far been discovered that this is the practical limit for successful tests.

The disclosed diamond truncated conical diamond loading probe successfully demonstrates the use of a carefully shaped and dimensioned part for providing both the necessary strength and fit to successfully perform fiber push-out and push-in tests. Though the disclosed use is specialized, it will find application in other areas where parts sized small enough to fit their application are too fragile to perform.

It is understood that certain modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

I claim:

1. A loading probe for a fiber push-out apparatus, comprising a diamond probe body having an end in the shape of a truncated cone, wherein the diameter of the probe body is greater than the diameter of the fiber to be pushed, wherein the diameter of the flat surface where the cone is truncated is at least one-half the diameter of the fiber to be pushed, and wherein the included angle of the truncated cone is in the range of 55° to 90°.

2. A method for performing a fiber push-out test on a fiber inside a fiber-matrix composite, comprising the steps of:

(a) providing a diamond probe body having an end in the shape of a truncated cone, wherein the diameter of the probe body is greater than the diameter of the fiber, wherein the diameter of the flat surface where the cone is truncated is at least one-half the diameter of the fiber, and wherein the included angle of the truncated cone is in the range of 55° to 90°; and, (b) pushing the fiber with the flat surface where the cone is truncated.

* * * * *